United States Patent
Gong et al.

(10) Patent No.: US 11,123,754 B2
(45) Date of Patent: Sep. 21, 2021

(54) LIQUID-LIQUID-SOLID THREE-PHASE SEPARATOR FOR WASTE OIL

(71) Applicant: CHONGQING TECHNOLOGY AND BUSINESS UNIVERSITY, Chongqing (CN)

(72) Inventors: Haifeng Gong, Chongqing (CN); Xianming Zhang, Chongqing (CN); Wenlong Li, Chongqing (CN); Ye Peng, Chongqing (CN)

(73) Assignee: CHONGQING TECHNOLOGY AND BUSINESS UNIVERSITY, Chongqing (CN)

( * ) Notice: Subject to any disclaimer, the term of this patent is extended or adjusted under 35 U.S.C. 154(b) by 76 days.

(21) Appl. No.: 16/819,152

(22) Filed: Mar. 15, 2020

(65) Prior Publication Data

US 2020/0316617 A1 Oct. 8, 2020

(30) Foreign Application Priority Data

Apr. 3, 2019 (CN) .......................... 201910264910.3

(51) Int. Cl.

| B04C 5/103 | (2006.01) |
|---|---|
| B01D 17/02 | (2006.01) |
| B01D 17/04 | (2006.01) |
| B01D 21/26 | (2006.01) |
| B01D 21/24 | (2006.01) |
| B04C 5/16 | (2006.01) |
| B04C 9/00 | (2006.01) |
| B01D 17/06 | (2006.01) |

(52) U.S. Cl.
CPC .......... *B04C 5/103* (2013.01); *B01D 17/0214* (2013.01); *B01D 17/0217* (2013.01); *B01D 17/042* (2013.01); *B01D 17/06* (2013.01); *B01D 21/245* (2013.01); *B01D 21/267* (2013.01); *B04C 5/16* (2013.01); *B04C 9/00* (2013.01); *B04C 2009/001* (2013.01)

(58) Field of Classification Search
CPC .... B01D 17/06; B01D 45/12; B04C 2009/001
See application file for complete search history.

(56) References Cited

U.S. PATENT DOCUMENTS

| 4,272,359 A | 6/1981 | Owen |
| 2020/0289960 A1* | 9/2020 | Gong ..................... C10G 33/06 |

FOREIGN PATENT DOCUMENTS

| CN | 107043204 A | 8/2017 |
| CN | 208136059 U | 11/2018 |

* cited by examiner

*Primary Examiner* — Brian W Cohen

(57) ABSTRACT

Disclosed is a liquid-liquid-solid three-phase separator for waste oil, including an oil-bath heating tank, a plurality of cyclone units and solid removal units. The cyclone units are provided and fixed in the oil-bath heating tank. Each of the solid removal units is connected to an underflow pipe of each of the cyclone units and is configured to separate solid particles. A solid removal outer pipe is arranged at a tail end of the underflow pipe via the first connector; the second connector is arranged at a tail end of the solid removal outer pipe; the solid removal inner pipe is arranged at an underflow outlet of the underflow pipe via the second connector to form a solid removal gap. The invention provides the demulsification and dehydration treatment of waste oil emulsion and the separation of solid particles.

9 Claims, 1 Drawing Sheet

LIQUID-LIQUID-SOLID THREE-PHASE SEPARATOR FOR WASTE OIL

CROSS-REFERENCE TO RELATED APPLICATIONS

This application claims the benefit of priority from Chinese Patent Application No. 201910264910.3, filed on Apr. 3, 2019. The content of the aforementioned application, including any intervening amendments thereto, is incorporated herein by reference in its entirety.

TECHNICAL FIELD

This application relates to waste oil treatment, and more particularly to a liquid-liquid-solid three-phase separator for waste oil.

BACKGROUND OF THE INVENTION

Lubricating oil, also called industrial blood, is widely used in mechanical engineering, electricity, transportation and chemical engineering, etc. Industrial waste oil is often produced during the storage, transportation, filling and usage of the lubricating oil. A great many impurities including solid particles, colloids and water are found in the industrial waste oil, which aggravate equipment corrosion and wear. Today, since oil resources are so scarce, recycling industrial waste oil is extremely important and practical for the environmental protection and the national strategy. For many industrial waste oil recycling processes, the first thing is to dehydrate, purify and remove the solid particles from the waste oil. Currently, the solid particles are generally removed by filtering. However, a filter screen will be blocked when a filter serves for a long time, resulting in reduced flow at an inlet of a separator and thus affecting the separation effect. It is difficult to enable highly efficient and economical dehydration, purification and removal of solid particles from the waste oil emulsion with complex ingredients by using a single technique or method. Combination of two or more methods or operating units can greatly improve the treating efficiency for industrial waste oil, and will has increasingly extended applications in the industrial waste oil purification in the future.

SUMMARY OF THE INVENTION

In view of this, an object of the invention is to provide a liquid-liquid-solid three-phase separator for an industrial waste oil, which achieves a low-cost and high-efficient liquid-liquid-solid three-phase separation of the industrial waste oil by combining oil-bath heating, electric field polarization coalescence, cyclone centrifugal separation, solid removal units, and other means and operating units.

To achieve the above object, the invention adopts the following technical solutions.

Provided is a liquid-liquid-solid three-phase separator for industrial waste oil, comprising:
an oil-bath heating tank,
a plurality of cyclone units, and
a plurality of solid removal units;
wherein the cyclone units are provided in the oil-bath heating tank, a plurality of support steel plates is provided on a tank body of the oil-bath heating tank; the cyclone units are fixed in the oil-bath heating tank via the support steel plates; each of the solid removal units is connected to an underflow pipe of each of the cyclone units and is configured to separate solid particles in a fluid from the underflow pipe.

In some embodiments, each of the solid removal units comprises a first connector, a solid removal inner pipe, a solid removal outer pipe and a second connector; the solid removal outer pipe is arranged at a tail end of the underflow pipe of each of the cyclone units via the first connector; the second connector is arranged at a tail end of the solid removal outer pipe, the solid removal inner pipe is arranged at an underflow outlet of the underflow pipe via the second connector to form a solid removal gap between the solid removal inner pipe and the underflow pipe; and a solid outlet is provided on the solid removal inner pipe.

In some embodiments, each of the cyclone units comprises an overflow pipe, a cyclone cavity section, a double-cone section and the underflow pipe which are arranged in sequence; the overflow pipe is provided with a positive electrode of a high-voltage power, and the double-cone section is provided with a negative electrode of the high-voltage power, so that a high-voltage pulsed electric field is generated in the cyclone cavity section.

In some embodiments, each of the cyclone units further comprises a diameter regulator for regulating diameter of the overflow pipe; the diameter regulator comprises a control motor and a rotary baffle, the rotary baffle is arranged in a radial direction along the overflow pipe and connected to the control motor via a drive unit, so that the rotary baffle is driven when the control motor rotates to change an equivalent diameter of the overflow pipe.

In some embodiments, the solid removal gap is a space between the solid removal inner pipe and the underflow pipe, and is changed by changing the space between the solid removal inner pipe and the underflow pipe.

In some embodiments, the overflow pipe is provided with an overflow outlet, overflow outlets of overflow pipes of the cyclone units are connected through a joint pipe for the overflow outlets; the underflow pipe is provided with the underflow outlet, underflow outlets of the cyclone units are connected through a joint pipe for the underflow outlets; the solid outlets of the solid removal units are connected through a joint pipe for the solid outlets; the cyclone cavity section is provided with oil inlets which are connected through a joint pipe for the oil inlets;

a main overflow outlet, a main solid outlet, a main underflow outlet and a main oil inlet are provided under the oil-bath heating tank; the main overflow outlet is connected to the joint pipe for the overflow outlets; the main solid outlet is connected to the joint pipe for the solid outlets; the main underflow outlet is connected to the joint pipe for the underflow outlets; and the main oil inlet is connected to the joint pipe for the oil inlets.

In some embodiments, the oil-bath heating tank is provided with a heated oil inlet.

In some embodiments, the oil-bath heating tank is provided with a vent, and the vent is provided with a vent valve for controlling flow at the vent.

In some embodiments, the cyclone units are fixed in the oil-bath heating tank by two support steel plates.

The invention has the following beneficial effects.

The liquid-liquid-solid three-phase separator overcomes defects of conventional separation according to characteristics of an industrial waste oil emulsion. The emulsion is heated by an outer oil-bath, which reduces viscosity and surface tension of the emulsion. In the electric field, coalescence of emulsion droplets is rapidly increased. In the cyclone centrifugal field, a liquid-liquid-solid three-phase separation is achieved, which not only realizes a demulsification and dehydration treatment of the emulsion, but also realizes a separation of the solid particles. Compared with conventional methods, the present invention greatly shortens the time of demulsification and solid removal, reduces energy consumption of emulsion purification, and has bright application prospects, good economic values and social benefits.

Other advantages, objectives and characteristics of the invention will be described in the subsequent description. To a certain extent, those skilled in the art are capable of carrying out research studies obviously based on the following content, or obtaining instructions from the practice of the present invention. The objects and other advantages of the present invention can be achieved and obtained by the following description.

BRIEF DESCRIPTION OF THE DRAWINGS

To make the object, technical solutions and beneficial effects of the invention clearer, the invention will be described with reference to the accompanying drawings.

Figure 1:
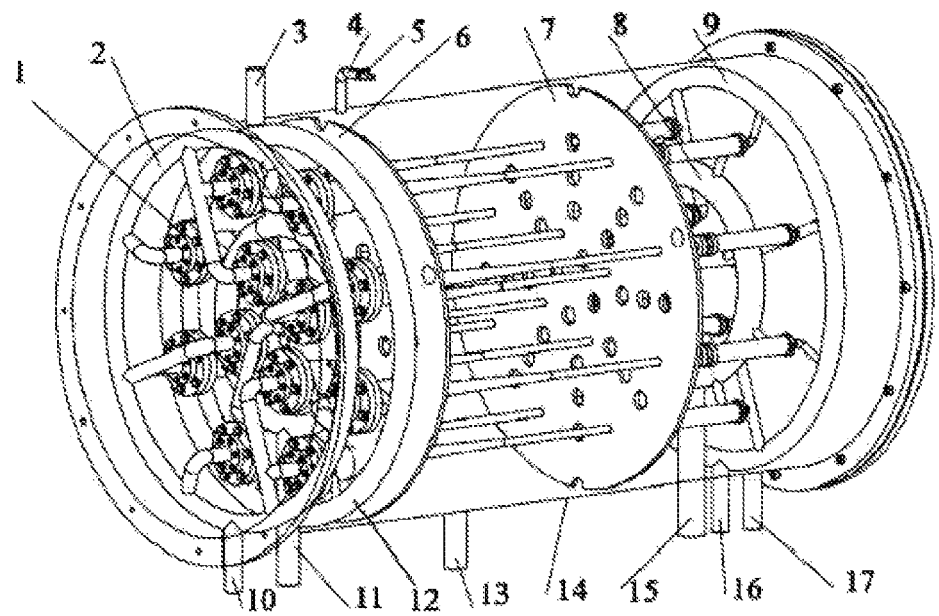
FIG. 1 is a perspective view of a liquid-liquid-solid three-phase separator for waste oil according to the present invention.

In the drawings, 1—composite double-cone bitangential cyclone unit, 2—joint pipe of overflow outlet, 3—heated oil inlet, 4—vent, 5—vent valve, 6—first support steel plate, 7—second support steel plate, 8—joint pipe of solid outlet, 9—joint pipe of underflow outlet, 10—main overflow outlet, 11—main oil inlet, 12—joint pipe of oil inlet, 13—drain port, 14—tank body of oil-bath heating tank, 15—main solid outlet, 16—main underflow outlet, 17—heated oil outlet, 18—overflow outlet, 19—overflow pipe, 20—diameter regulator of overflow pipe, 21—seal ring, 22—gap regulator of underflow pipe, 23—underflow outlet, 24—insulating sleeve, 25—flange, 26—oil inlet, 27—solid outlet, 28—solid removal inner pipe, 29—first connector, 30—second connector, 31—solid removal outer pipe.

DETAILED DESCRIPTION OF EMBODIMENTS

The invention will be further described with reference to the accompanying drawings and embodiments, from which those skilled in the art will better understand and enable the present invention. However, the embodiments herein are not intended to limit the scope of the invention.

Figure 2:
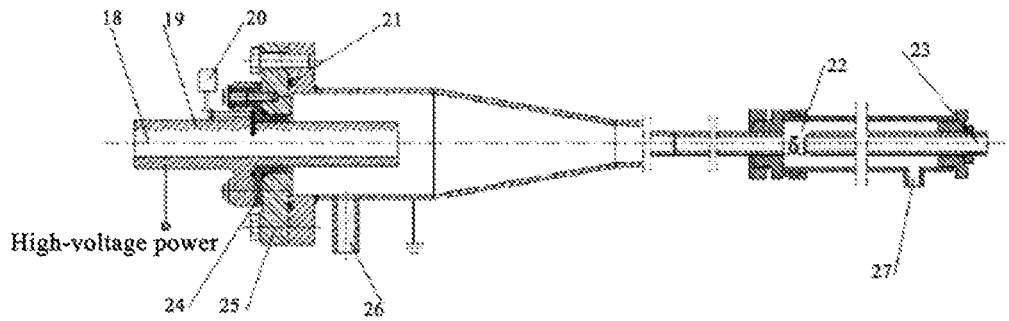
FIG. 2 schematically shows a composite double-cone bitangential cyclone unit according to the present invention.
Figure 3:
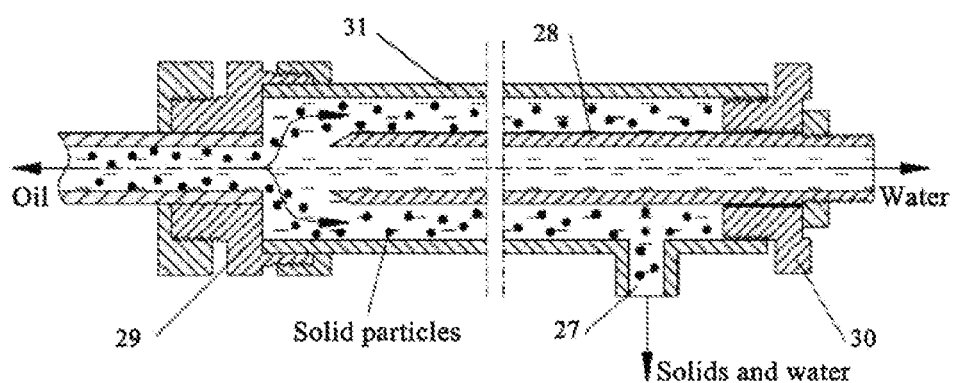
FIG. 3 schematically shows a solid removal unit according to the present invention.

As shown in FIGS. 1-3, provided is a liquid-liquid-solid three-phase separator for a waste oil, including: an oil-bath heating tank, a plurality of cyclone units 1 and a plurality of solid removal units; the cyclone units 1 are provided and fixed in the oil-bath heating tank by a first support steel plate 6 and a second support steel plate 7; an underflow pipe is provided on each of the cyclone units 1, each of the solid removal units is provided at an underflow outlet 23 of the underflow pipe, the underflow pipe is connected to each of the solid removal units in a thread method.

Each of the solid removal units includes a first connector 29, a solid removal inner pipe 28, a solid removal outer pipe 31 and a second connector 30; the solid removal outer pipe 31 is arranged at a tail end of the underflow pipe of each of the cyclone units 1 via the first connector 29; the second connector 30 is arranged at a tail end of the solid removal outer pipe 31, the solid removal inner pipe 31 is arranged in a middle of the second connector 30 which is configured to fix the solid removal inner pipe 28 and form a solid removal gap between the solid removal inner pipe 28 and the underflow pipe; a solid outlet 27 is provided on the solid removal inner pipe 31; each of the cyclone units 1 further includes a diameter regulator 20 for regulating diameter of an overflow pipe 19, the diameter regulator 20 includes a control motor and a rotary baffle, the rotary baffle is arranged in a radial direction along the overflow pipe 19 and connected to the control motor via a drive unit, so that the rotary baffle is driven when the control motor rotates to change an equivalent diameter of the overflow pipe 19; the solid removal gap is a space between the solid removal inner pipe 28 and the underflow pipe, and is changed by changing the space between the solid removal inner pipe 28 and the underflow pipe.

Each of the cyclone units 1 includes a double-cone section, the underflow pipe and the overflow pipe 19; the overflow pipe 19 and the underflow pipe are separately provided at each end of the double-cone section; the overflow pipe 19 is provided with a positive electrode of a high-voltage power, and the double-cone section is a negative electrode of the high-voltage power, so that a high-voltage pulsed electric field is generated in an internal cavity of the double-cone section, and a high-voltage electric field is generated between an outer wall of the overflow pipe 19 and an inner wall of a straight pipe section.

The overflow pipe 19 is provided with an overflow outlet 18, overflow outlets 18 of overflow pipes 19 of the cyclone units 1 are connected through a joint pipe 2 for the overflow outlets 18; the underflow pipe is provided with an underflow outlet 23, underflow outlets 23 of the cyclone units 1 are connected through a joint pipe 9 for the underflow outlets 23; the solid outlets 27 of the solid removal units are connected through a joint pipe 8 for the solid outlets 27; a cyclone cavity section is provided with oil inlets 26 which are connected through a joint pipe 12 for the oil inlets 26.

A main overflow outlet 10, a main solid outlet 15, a main underflow outlet 16 and a main oil inlet 11 are provided under the oil-bath heating tank; the main overflow outlet 10 is connected to the joint pipe 2 for the overflow outlets 18; the main solid outlet 15 is connected to the joint pipe 8 for the solid outlets 27; the main underflow outlet 16 is connected to the joint pipe 9 for the underflow outlets 23; the main oil inlet 11 is connected to the joint pipe 12 for the oil inlets 26.

In the embodiment, in order to satisfy the mass-flow processing requirements of the separator, multiple cyclone units 1 are installed in a tank body 14 of the oil-bath heating tank and fixed by the first support steel plate 6 and the second support steel plate 7. A heated oil inlet 3 is provided above the tank body 14, and a heated oil outlet 17 and a drain port 13 are provided below the tank body 14. Gas may be generated in a demulsification process, which increases a pressure in the tank body 14, affects the demulsification and even damages the tank body 14. Therefore, a vent 4 and a vent valve 5 are provided above the tank body 14. Moreover, a pressure gage is mounted, so that staffs can estimate whether an exhausting is needed by observing the pressure of the oil-bath heating tank in the demulsification process.

The invention is based on a body structure of a symmetrical double-cone hydrocyclone with bitangential inlets. A high-voltage electrode is embedded in the overflow pipe 19, achieving a structural coupling of a high-voltage pulsed electric field and a cyclone centrifugal field, so that coalescence is increased after an emulsion enters the electric field, large droplets are separated under the centrifugal field, and a demulsification and dehydration treatment of an oil-water emulsion is achieved. In addition, the solid removal unit is installed at the underflow outlet 23 to remove solid particles in the industrial waste oil, which eliminates pre-filter units, and achieves fast, efficient and economical dehydration purification and solid removal of industrial waste oil.

In the embodiment, each of the composite double-cone bitangential cyclone units 1 includes a copper electrode on the overflow pipe 19, a high-voltage pulsed electric power, the diameter regulator 20 for regulating diameter of the overflow pipe 19 and a gap regulator 22 for regulating gap of the underflow pipe. T-pipes are configured on oil supply pipes of the cyclone units 1 to keep fluxes of two tangential oil inlets consistent. The overflow pipe 19 is connected to a positive electrode of a high-voltage power, and the double-cone section is grounded to be a negative electrode, so that a high-voltage pulsed electric field is generated in an internal cavity of the double-cone section. The waste oil is rapidly heated under an oil-bath after entering the separator, which reduces viscosity and surface tension of the emulsion. Meanwhile, emulsion droplets are transformed in the electric field, collision frequency and rupture probability of interface films between the emulsion droplets are increased, so that the coalescence of the emulsion droplets is rapidly increased to promote the dehydration process. In the centrifugal field, water is separated from the emulsion and gathers nearby a wall surface of each of the cyclone units 1, and rotationally enters the underflow pipe downward; oil gathers at an axial area of each of the cyclone units 1, forming a reversed flow and discharging from the overflow outlet 18; a large amount of solid particles mixed in the separated water rotationally enters the underflow pipe downward. To achieve a soil-fluid separation, each of the solid removal units is provided on the underflow outlet 23 to separate the solid particles from the water under a centrifugal force. The solid particles are discharged from the solid outlet 27, the water is discharged from the solid removal inner pipe 28, such that a liquid-liquid-solid three-phase separation of the waste oil is achieved. Besides, each of the cyclone units 1 is provided with the diameter regulator 20 of the overflow pipe 19 at a top and the gap regulator 22 of the underflow pipe at a rear, which can adjust according to operation parameters and three-phase characteristics of oil-water-solid to achieve a best separation effect. The diameter regulator 20 of an overflow pipe 19 includes the control motor and the rotary baffle, where the equivalent diameter of the overflow pipe 19 is changed by driving the rotary baffle to rotate to a certain position via the control motor. The solid removal gap is determined by an entering length of the underflow pipe in each of the solid removal units.

Described above are merely preferred embodiments of the invention, which are intended to fully describe the invention, and are not intended to limit the invention. Any replacements and variations made by those skilled in the art without departing from the spirit of the invention should fall within the scope of the invention.

What is claimed is:

1. A liquid-liquid-solid three-phase separator for industrial waste oil, comprising:
an oil-bath heating tank,
a plurality of cyclone units, and
a plurality of solid removal units;
wherein the cyclone units and the plurality of solid removal units are provided in the oil-bath heating tank, a plurality of support steel plates is provided on a tank body of the oil-bath heating tank; the cyclone units are fixed in the oil-bath heating tank via the support steel plates; and each of the solid removal units is connected to an underflow pipe of the cyclone units and is configured to separate solid particles in a fluid from the underflow pipe.

2. The separator of claim 1, wherein each of the solid removal units comprises a first connector, a solid removal inner pipe, a solid removal outer pipe and a second connector; the solid removal outer pipe is arranged at a tail end of the underflow pipe of each of the cyclone units via the first connector; the second connector is arranged at a tail end of the solid removal outer pipe, the solid removal inner pipe is arranged at an underflow outlet of the underflow pipe via the second connector to form a solid removal gap between the solid removal inner pipe and the underflow pipe; and a solid outlet is provided on the solid removal inner pipe.

3. The separator of claim 2, wherein each of the cyclone units comprises an overflow pipe, a cyclone cavity section, a double-cone section and the underflow pipe which are arranged in sequence; the overflow pipe is provided with a positive electrode of a high-voltage power, and the double-cone section is provided with a negative electrode of the high-voltage power, so that a high-voltage pulsed electric field is generated in the cyclone cavity section.

4. The separator of claim 3, wherein each of the cyclone units further comprises a diameter regulator for regulating diameter of the overflow pipe; the diameter regulator comprises a control motor and a rotary baffle, the rotary baffle is arranged in a radial direction along the overflow pipe and connected to the control motor via a drive unit, so that the rotary baffle is driven when the control motor rotates to change an equivalent diameter of the overflow pipe.

5. The separator of claim 2, wherein the solid removal gap is a space between the solid removal inner pipe and the underflow pipe, and is changed by changing the space between the solid removal inner pipe and the underflow pipe.

6. The separator of claim 3, wherein the overflow pipe is provided with an overflow outlet, overflow outlets of overflow pipes of the cyclone units are connected through a joint pipe for the overflow outlets; the underflow pipe is provided with the underflow outlet, underflow outlets of the cyclone units are connected through a joint pipe for the underflow outlets; the solid outlets of the solid removal units are connected through a joint pipe for the solid outlets; the cyclone cavity section is provided with oil inlets which are connected through a joint pipe for the oil inlets.

7. The separator of claim 3, wherein a main overflow outlet, a main solid outlet, a main underflow outlet and a main oil inlet are provided under the oil-bath heating tank; the main overflow outlet is connected to the joint pipe for the overflow outlets; the main solid outlet is connected to the joint pipe for the solid outlets; the main underflow outlet is connected to the joint pipe for the underflow outlets; and the main oil inlet is connected to the joint pipe for the oil inlets.

8. The separator of claim 1, wherein the oil-bath heating tank is provided with a vent, and the vent is provided with a vent valve for controlling flow at the vent.

9. The separator of claim 1, wherein the cyclone units are fixed in the oil-bath heating tank by two support steel plates.

* * * * *